Patented Sept. 15, 1953

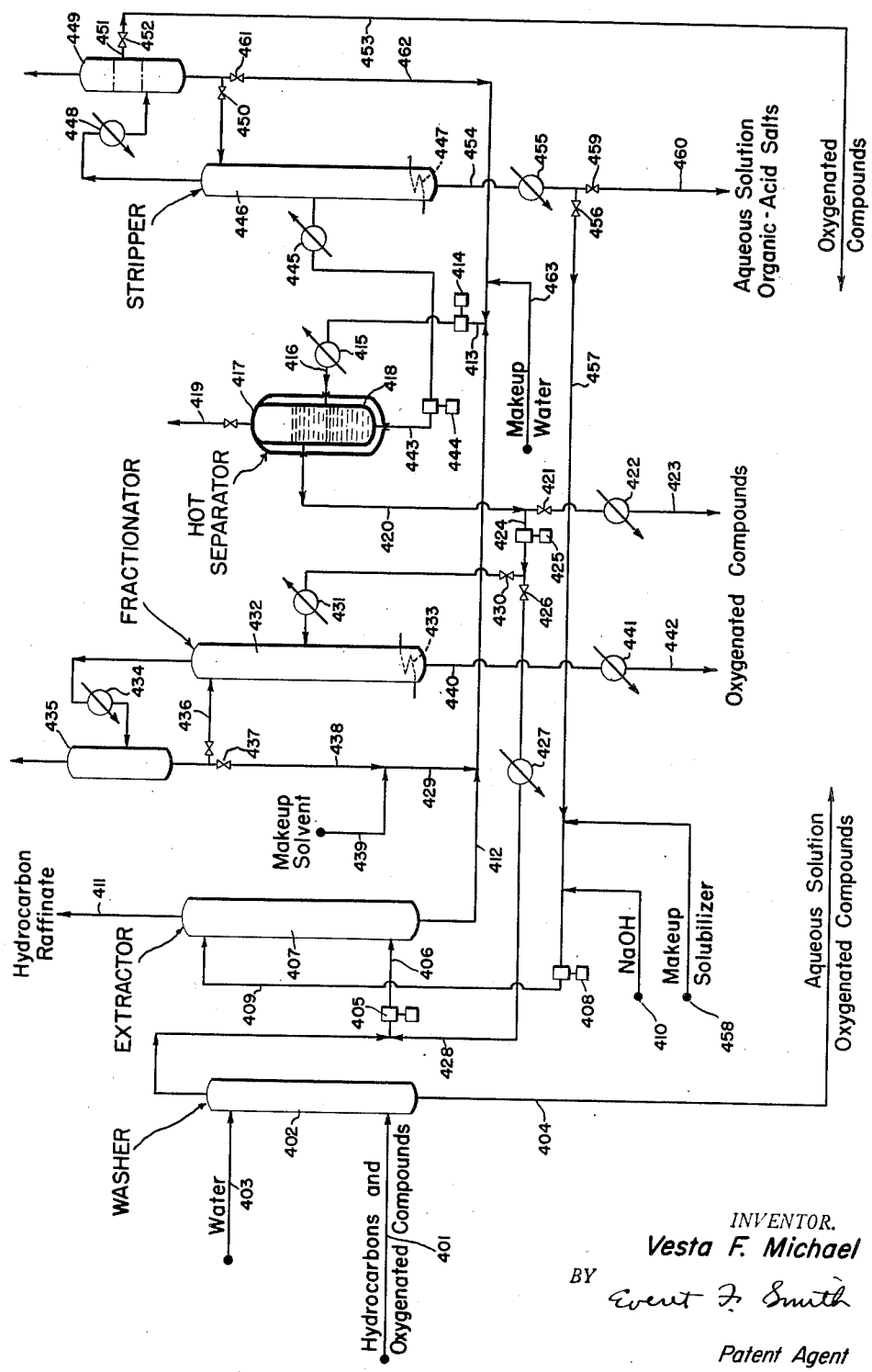

2,652,415

UNITED STATES PATENT OFFICE 2,652,415

RECOVERY OF ORGANIC OXYGENATED COMPOUNDS

Vesta F. Michael, Wichita, Kans., assignor to Stanolind Oil and Gas Company, Tulsa, Okla., a corporation of Delaware Application September 29, 1948, Serial No. 51,808

6 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions.

My invention is an improvement over the method for separating oxygenated compounds from hydrocarbon solutions thereof by extracting the oxygenated compounds with an aqueous solubilizer solution comprising a substantially non-surface-active salt of an organic acid, suitably a carboxylic acid containing less than twelve carbon atoms in the molecule, set forth in my copending application, Serial No. 771,318, filed August 29, 1947, now abandoned, of which this application is a continuation-in-part. By means of this step, in combination with a novel method for rejecting dissolved hydrocarbon contaminants from the resulting aqueous extract, as hereinafter set forth, I am able to separate a high proportion of organic oxygenated compounds in substantially purified form from hydrocarbon solutions comprised thereof.

Numerous methods for preparing organic oxygenated compounds have been devised and reported in the prior art. Many of the methods produce the desired products in substantially pure conditions, or in such mixtures that separation is comparatively simple by conventional means. Other methods, however, are less selective, and tend to produce complex mixtures from which the isolation of pure components is exceedingly difficult. For example, the direct oxidation of natural gas or of other hydrocarbon gases is potentially one of the cheapest sources of oxygenated compounds, and the method has therefore been studied extensively. The reaction products, however, are a complex mixture of the theoretically derivable organic oxygenated compounds, the isolation of which has proved to be very difficult. As a further example, the so-called Fischer-Tropsch synthesis, wherein carbon monoxide and hydrogen are reacted in the presence of a suitable catalyst, such as iron or cobalt, produces primarily hydrocarbons, but in addition a small yield of oxygenated compounds.

More recently, a new and improved process for the hydrogenation of carbon monoxide has been developed which permits the use of the fluidized-catalyst technique. The use of this new technique with a catalyst of suitable composition in combination with carefully chosen conditions of temperature, pressure, and space velocity gives not only much greater space-time yields, but also products of a more desirable boiling range and higher octane number. In addition, relatively higher yields of oxygenated compounds are produced.

In one embodiment of the new fluidized-iron process, for example, wherein reduced iron catalysts containing around 1% of an alkali-metal compound, such as potassium hydroxide or potassium fluoride, are used to hydrogenate carbon monoxide, a water layer containing up to 15 percent or more of oxygenated compounds, and a hydrocarbon layer containing up to 40 percent or more of oxygenated compounds are produced under the following approximate conditions:

Catalyst _____ Iron.
Promoter _____ Potassium carbonate.
Promoter concentration _____ 0.5–2.0 percent by weight.
Temperature _____ 550–650° F.
Pressure _____ 100–500 lb./in.$^2$, gage.
Space velocity _____ 4–20 cu. ft. CO, measured at 60° F. and 1 atmosphere, per pound of iron per hour.
CO concentration in feed _____ 10–20 percent by volume.
H$_2$:CO ratio in feed __ 1.5–6.

The two layers have been found to contain the following organic oxygenated compounds: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; methanol, ethanol, n-propyl alcohol, n-butyl alcohol, isobutyl alcohol, n-pentyl alcohol, n-octyl alcohol, n-decyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids; esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols. The hydrocarbons in the product comprise virtually the entire range of saturated and unsaturated hydrocarbons, from dissolved methane to high-melting waxes. The following table illustrates the daily output of the major oxygenated products from a plant employing the new process to produce 6,000 barrels per day (42 gallons per barrel) of gasoline-range hydrocarbons:

| | gal./day |
|---|---|
| Aqueous phase— | |
| Acetaldehyde | 4,247 |
| Propionaldehyde | 873 |
| Acetone | 5,170 |
| Methanol | 333 |
| Butyraldehyde | 1,231 |
| Methyl ethyl ketone | 2,171 |
| Ethanol | 30,322 |
| n-Propyl alcohol | 6,879 |
| n-Butyl alcohol | 2,036 |
| n-Pentyl alcohol | 504 |
| Acetic acid | 8,609 |
| Propionic acid | 3,217 |
| Butyric acid | 1,579 |
| Hydrocarbon phase— | |
| Aldehydates and ketones | 3,964 |
| Alcohols | 4,492 |
| Acids | 3,629 |

It will be obvious to those skilled in the art that the isolation of individual components from such a complex mixture would be exceedingly difficult by any known methods. Simple, direct, fractional distillation of either the hydrocarbon phase or the aqueous phase is not feasible because of the numerous multiple-component azeotropes that are known to exist among the various constituents, and because of the tendency of certain of the compounds to react, decompose, or polymerize when such a mixture is exposed to elevated temperatures for considerable periods of time. Moreover, the prior art discloses no selective solvent or solvents capable of effecting the separation of such mixtures into the individual components.

In this situation, I have devised a new and effective technique for isolating the components of the water-soluble aqueous products, as described in my copending application, Serial No. 748,295, filed May 15, 1947. Until now, however, the recovery of the oil-soluble oxygenated products on a large scale has been considered virtually impossible, and serious consideration has been given to the conversion or destruction of these compounds by means of solid catalysts at high temperatures to produce a liquid hydrocarbon product suitable for use as a motor fuel. I have now devised a unique, surprisingly simple, and effective technique, involving successive extractions, by which I am able to isolate a remarkably high proportion of the oil-soluble oxygenated products.

One object of my invention is to provide a method for separating and purifying mixtures of organic oxygenated compounds from mixtures thereof with hydrocarbons. Another object of my invention is to provide a method for segregating hydrocarbon mixtures comprising organic oxygenated compounds into generically dissimilar groups of compounds. A further object of my invention is to provide a process for recovering organic oxygenated compounds, such as alcohols, aldehydes, ketones, carboxylic acids, and phenolic compounds, from hydrocarbon solutions thereof, suitably hydrocarbon solutions resulting from the oxidation of hydrocarbon gases, or from the hydrogenation of oxides of carbon, in particular carbon monoxide. Another object of my invention is to effect the extraction of organic oxygenated compounds from hydrocarbon solutions thereof, employing an aqueous extractant solution comprising a substantially non-surface-active salt of an organic acid, and to remove the organic oxygenated compounds from the resulting aqueous extract in a convenient and efficacious manner. Another object of my invention is to produce a hydrocarbon product relatively free of oxygenated compounds. A still further object is to produce a motor fuel of relatively good odor and of improved stability with respect to antiknock rating. Other objects of my invention, and its advantages over the prior art, will be apparent from the following description.

The term "generically dissimilar groups of compounds" occurring herein is to be understood as meaning groups having dissimilar chemical properties. Under this definition, alcohols and phenols are generically dissimilar groups; and ketones, aldehydes, and carboxylic acids are others.

In the prior art, it is reported that alcohols can be removed from diesel oils and other hydrocarbons by extraction with aqueous solutions of fatty-acid soaps, such as sodium oleate and sodium stearate. The commercial utilization of this process, however, has not been possible, owing to the tendency of such soap solutions to form stable emulsions when contacted with hydrocarbons. This difficulty is especially manifest when a variety of oxygenated compounds are present in the hydrocarbons, and the difficulty is intensified by the intimate contact of the aqueous and hydrocarbon phases which is necessary in order to effectuate the transfer of the alcohols into the aqueous phase.

In my copending application, Serial No. 771,318, filed August 29, 1947, now abandoned, I have disclosed that oxygenated compounds in general can be removed conveniently and effectively from hydrocarbon solutions by extracting said solutions with an aqueous solution of a water soluble salt of a carboxylic acid containing less than twelve carbon atoms in the molecule. Such salts are substantially non-surface-active, and have comparatively little tendency to form emulsions when contacted with hydrocarbon solutions. In the practical application of my process, I prefer to use water-soluble salts of mixed carboxylic acids comprising predominantly acids having less than twelve carbon atoms in the molecule, or salts of mixtures of carboxylic acids having a weighted average of less than eleven carbon atoms in the molecule. In particular, alkali-metal salts of the mixture of carboxylic acids and phenols produced in the hydrogenation of carbon monoxide, as described above, are convenient solubilizers for use in my process.

I have now further discovered that dissolved hydrocarbon contaminants and a portion of the organic oxygenated compounds can be separated from the resulting aqueous extract in an especially convenient, efficacious, and economical manner by a method which comprises the following steps:

A. The aqueous extract is heated to an elevated temperature, suitably between about 60 and 100° C. or higher to effect the separation of dissolved hydrocarbons and higher-boiling organic oxygenated compounds therefrom as an organic phase.

B. The separated organic phase is withdrawn.

C. The partially depleted aqueous phase is subjected to steam distillation to strip out all or the greater part of the organic oxygenated compounds remaining therein.

On the basis of these discoveries, I am now able to make a substantially complete segregation of organic oxygenated compounds and hydrocarbons by a process which may include the following steps:

1. Separation of aldehydes and ketones from the hydrocarbon solution.
2. Extraction of the hydrocarbon raffinate from step 1 with an aqueous solution of a mild alkali to remove carboxylic acids.
3. Extraction of the hydrocarbon raffinate from step 2 with an aqueous caustic solution, such as aqueous sodium hydroxide, to separate phenolic compounds.
4. Extraction of the hydrocarbon raffinate from step 3 with an aqueous solution of a solubilizer for organic oxygenated compounds, comprising a substantially non-surface-active salt of a carboxylic acid, to remove alcohols and any residual carbonyl compounds.
5. Treatment of the extract from step 4 as described in steps A, B, and C, above, to recover organic oxygenated compounds therefrom.

It will be apparent that numerous modifications may be made in the various manipulative operations employed in the process of my invention without departing from the spirit thereof. The following embodiments will illustrate such modifications and emphasize the adaptability of my process:

4a. A major proportion of the alcohols contained in a hydrocarbon solution, together with a substantial proportion of the aldehydes and ketones contained therein, may be removed by contacting the hydrocarbon solution with an aqueous extractant solution containing a member of my defined class of solubilizer salts.

4b. Alcohols, aldehydes, ketones, carboxylic acids, and phenolic compounds may be removed simultaneously from a hydrocarbon solution thereof by contacting the hydrocarbon solution with an aqueous extractant solution containing a free base and a member of my defined class of solubilizer salts.

4c. The hydrocarbon raffinate from step 1 may be extracted with an aqueous solution containing a caustic compound and a member of my defined class of solubilizer salts. Alcohols, carboxylic acids, phenolic compounds, and any residual carbonyl compounds are thereby removed simultaneously from the hydrocarbon stream.

4d. The hydrocarbon raffinate from step 1 may alternatively be extracted with an aqueous solution of solubilizer salt plus a mild alkali. In this modification, alcohols, carboxylic acids, and any residual carbonyl compounds are removed simultaneously, together with a portion of the phenolic compounds. This modification is particularly suitable when only small quantities of phenolic compounds are present in the hydrocarbon. The remaining phenolics may subsequently be extracted with an aqueous caustic solution, if desired.

In step 1, as defined above, the separation of the aldehydes and ketones may be carried out by known means, such as by reaction to form solid derivatives, well known in the art, which may be removed by filtration; or by reaction with bisulfites to form water-soluble addition compounds. I prefer to carry out the separation by the latter method, utilizing an aqueous solution of a water-soluble bisulfite, such as sodium bisulfite, to extract the hydrocarbon solution of oxygenated compounds. The bisulfite extraction should be carried out under conditions at which the bisulfite addition compounds with aldehydes and ketones are stable, suitably at temperatures between about 0 and 40° C. and at pH levels between about 2.2 and 8. For the most effective extraction of aldehydes and ketones from the hydrocarbon phase, the aqueous bisulfite extracting solution contacting each increment of the hydrocarbon phase should contain a quantity of free bisulfite at least equivalent to, and preferably up to between 50 and 100% in excess of, the aldehydes and ketones in the hydrocarbon-phase increment.

In carrying out the extraction of aldehydes and ketones with aqueous bisulfite solutions, it would ordinarily be desirable to utilize as concentrated a bisulfite solution as possible, in order to minimize the volume of extract subsequently to be processed. However, alcohols are solubilized to a substantial degree by the resulting aldehyde and ketone bisulfite addition products. For this reason, I prefer to utilize a solution having a medium to low concentration of bisulfite for the extraction. It will be obvious that solutions of substantially any concentration are operative, but I ordinarily prefer to use solutions having a bisulfite concentration within the range of about 3 to 25 percent, calculated as anhydrous sodium bisulfite. The resulting aqueous bisulfite extract will ordinarily contain a quantity of dissolved organic impurities, particularly alcohols, for the reasons given above. Before the regeneration of aldehydes and ketones therefrom, it is therefore desirable to separate the impurities, as by steam distillation at temperatures low enough to avoid destruction of the bisulfite adducts, or by extraction with a selective solvent. For the latter alternative, a light hydrocarbon, such as pentane, or an aliphatic ether, such as ethyl ether, is suitable. After purification of the extract, the aldehydes and ketones may be regenerated by known means. For example, the addition compounds may be decomposed by adding a suitable chemical, such as an alkali or a strong acid. Or the solution may be heated to a temperature at which the addition compounds decompose, suitably above about 80° C., whereupon aldehydes and ketones form a separate phase and may be withdrawn by decantation or by steam distillation. In the latter case, the regenerated bisulfite solution may be recycled to the initial extraction step.

In step 4, alcohols are extracted from the hydrocarbon raffinate obtained in step 3. For this extraction, I have successfully employed an aqueous solution of an alcohol-solubilizer comprising an alkali-metal salt of a carboxylic acid containing eleven or less carbon atoms in the molecule. Alkali-metal salts of such acids are substantially non-surface-active, and I have found them to have little or no tendency to form emulsions under the conditions employed in the extraction. In this respect, the solubilizers of my invention are vastly superior to the fatty-acid soaps, such as sodium oleate and sodium stearate, employed for the same purpose in the prior art, since the soaps cause the formation of emulsions that are virtually impossible to break. I do not find it necessary, however, to exclude surface-active soaps from my solubilizer composition altogether; but in order to avoid emulsification difficulties, the solubilizer should comprise predominantly the non-surface-active constituents as defined above, and should preferably contain around 75 percent or more of such non-surface-active constituents. I have further discovered that water-soluble salts of various mixtures of carboxylic acids are distinctly superior to salts of single acids; and I have found it particularly advantageous to use an aqueous solution of salts of the carboxylic and phenolic acids produced by the hydrogenation of carbon monoxide in one of the various processes described above, and extracted in steps 2 and 3 of my process, as set forth below in a specific example. The latter composition ordinarily consists primarily of alkanoates having less than eleven carbon atoms in the molecule.

The non-surface-active salts of carboxylic acids suitable for use in my process are water-soluble metal-organic compounds that are to be understood as including alkanoates such as acetates, propionates, valerates, caproates, undecanoates, and the like, of the alkali metals, in particular sodium and potassium, and of ammonium and substituted ammoniums; alkenoates and such as acrylates, crotonates, isocrotonates, and the like; alkanedioates such as malonates, adipates, azelates, sebacates, and the like; alkenedioates such as maleates, fumarates, and the like; cycloalkanecarboxylates such as cyclopentanecarboxylates, cyclohexanecarboxylates, and the like; and arylcarboxylates such as benzoates, phthalates, and the like. My extractant salts may also be associated with minor proportions of surface-active alkanoates, such as myristates, palmitates, oleates, stearates, and the like.

I have also found it advantageous to incorporate in the solubilizer solution a quantity, suitably up to around 10 percent, of a lower aliphatic alcohol, such as methanol, ethanol, or isopropyl alcohol, to assist in the extraction of higher-molecular-weight oxygenated compounds.

In effecting the extraction of organic oxygenated compounds with the solubilizer solutions disclosed above, I may employ virtually any concentration of solubilizer, so long as the solution is liquid under the conditions employed in the extraction. For example, I may use a solution containing from 10 to 30 percent by weight of solubilizer, as disclosed in my parent application, referred to above; or I may advantageously use a solution containing up to around 60 percent by weight of solubilizer, as disclosed in the copending application of Scott W. Walker, Serial No. 771,264, filed August 29, 1947, now abandoned. I prefer to operate at ordinary temperatures, but somewhat reduced and elevated temperatures, for example up to approaching 60° C., are operative. The pressure during the extraction is not critical, and is ordinarily maintained at one atmosphere or at the autogenous pressure of the process materials.

In step 5, the advantageous features of my present invention are realized by heating the aqueous extract from step 4 or its various modifications to an elevated temperature to effect a partial desolubilization and release of the hydrocarbon contaminants and higher-boiling organic oxygenated compounds contained therein. Temperatures above about 60° C. are suitable for this purpose, and I may use temperatures up to 100° C. or above, at elevated pressures if necessary to avoid loss of materials by volatilization. I prefer to operate at temperatures between about 75 and 100° C., at which a second phase ordinarily separates, containing organic oxygenated compounds and hydrocarbon impurties. This phase is withdrawn, and the depleted aqueous phase is subjected to direct or indirect distillation with steam, preferably in the presence of an antifoam agent, such as a silicone, to strip out the remaining organic oxygenated compounds and to render the aqueous solubilizer solution suitable for recycling.

Various modifications may be made in the heat-treatment operation of step 5. For example, prior to or during the heat treatment I may dilute the aqueous extract with water to encourage the separation of a second phase. Alternatively or additionally, I may subject the aqueous extract to extraction with an immiscible solvent during or after the heat treatment, and before or after the separation of a second phase as a result of the heat treatment. This is a highly useful modification of my invention, and is a necessary part thereof where, owing to the composition of the aqueous extract, simple heat treatment, with and without dilution, does not readily bring about the formation of a second phase. Suitable solvents are aliphatic, alicyclic, and aromatic hydrocarbons, aliphatic ethers, halohydrocarbons, and the like.

The heat-treatment operation of step 5 is a highly advantageous improvement in the separation of organic oxygenated compounds from the aqueous solubilizer solution. Without the heat treatment, the steam distillation of oxygenated compounds from the aqueous solubilizer solution is an exceedingly slow procedure, and highly wasteful of steam and process equipment. Moreover, the resulting distillate is heavily contaminated with hydrocarbons. After the heat treatment, on the other hand, and after the withdrawal of the organic phase thereby separated, the steam distillation of the depleted aqueous solublizer solution is surprisingly rapid and economical, and the resulting distillate contains a greatly reduced quantity of hydrocarbons.

Subsequent processing of the various fractions produced in the above steps may be carried out according to methods known in the art, or described in copending applications. Specifically, fractional distillation, azeotropic distillation, and extractive distillation may be employed for separating the individual components of the aldehyde and ketone mixture that is obtained in step 1 and of the mixture of organic oxygenated compounds that is separated from the extract in step 5. Similar techniques may be utilized further to purify the hydrocarbon raffinate streams obtained at various stages of my process, or the raffinates may be contacted with various adsorption agents, such as silica gel, activated alumina, and the like, to separate substantially all oxygenated compounds therefrom. The aqueous solution of organic acid salts resulting from step 2, after separation of any alcohols, aldehydes, or ketones dissolved therein, may be treated with a strong acid such as sulfuric acid to regenerate the organic acids, and the organic acids may then be withdrawn and further processed, as by fractional distillation. The same procedure is suitable for further processing the aqueous solution of phenolates resulting from step 3. The aqueous solution of solubilizer and oxygenated compounds obtained in step 4b, 4c, or 4d may first be processed as in step 5 to separate the oxygenated compounds; subsequently a portion may be withdrawn for isolation of the organic acids, as described above, and the remainder of the depleted solubilizer solution may be recycled to the 4b, 4c, or 4d extraction step.

Prior to processing a liquid hydrocarbon stream according to my invention, I ordinarily prefer to subject the hydrocarbon stream to a preliminary scrubbing with water, as taught, for example, in my copending U. S. Patent 2,625,560, issued January 13, 1953, in order to effect a preliminary separation by removing water-soluble oxygenated compounds therefrom. Prior to treating a liquid hydrocarbon associated with liquid water, I may choose to decant or otherwise separate the liquid hydrocarbon phase from the liquid water phase at a controlled temperature in order to regulate the distribution of oxygenated compounds between the phases. In general, I have observed that the higher the temperature at which the separation is conducted, the greater the concentration of oxygenated compounds in the hydrocarbon phase. I may therefore choose to effect the phase separation at a substantially elevated temperature, and under pressure if required to prevent volatilization losses.

Reference will now be made to the attached flowsheet, which illustrates an embodiment of my invention in which all but a minor proportion of organic oxygenated compounds are removed from a hydrocarbon solution thereof by a single extraction with a concentrated aqueous solution of my defined class of solubilizer salts, and the oxygenated compounds are subsequently recovered from the resulting aqueous extract by the heat-treatment method of my invention, optionally with water-dilution and the addition of an immiscible solvent.

A hydrocarbon stream, produced by the hydrogenation of carbon monoxide in the presence of an alkali-promoted iron catalyst, and containing alcohols, carbonyl compounds, and organic acids, is introduced through line 401 into the bottom of washer 402, where it rises countercurrent to a stream of water, introduced into the top of the washer through line 403. The water scrubs out the greater portion of the water-soluble organic oxygenated compounds contained in the hydrocarbon stream. The resulting aqueous solution of oxygenated compounds that emerges from the bottom of the washer through line 404 is combined with the original aqueous phase obtained in the hydrogenation of carbon monoxide, and is subjected to further processing to isolate the oxygenated compounds therein, suitably as described in my copending application, Serial No. 748,295, referred to above.

The scrubbed hydrocarbon stream emerging from the top of washer 402 is transferred by pump 405 through line 406 into the bottom of extractor 407, and is allowed to rise countercurrent to a downward-flowing aqueous solubilizer solution, introduced by pump 408 through line 409 into the top of the extractor, and containing around 50% by weight of sodium salts of a mixture of organic acids similar to the mixture of organic acids contained in the hydrocarbon stream. In addition, a sufficient quantity of sodium hydroxide or other free base to react with the organic acids present in the hydrocarbon stream is introduced into the solubilizer stream through line 410 ahead of pump 408. The combined aqueous alkaline salt solution extracts up to 90 percent or more of the oxygenated compounds from the hydrocarbon stream, and the hydrocarbon reaffinate emerges from the top of extractor 407, from which it is transferred through line 411 to storage or to further processing.

The aqueous extract emerging from the bottom of extractor 407 through line 412 flows through line 413 into pump 414 and is transferred thereby into heater 415. Therein, the stream is heated to a temperature above about 60° C., and is transferred through line 416 into hot separator 417, equipped with jacket 418 and valved vent line 419. Liberated oxygenated compounds and hydrocarbon impurities form a separate phase in separator 417, and may be withdrawn through line 420, valve 421, cooler 422, and line 423. The liberated organic phase in separator 417 contains the major proportion of the hydrocarbon impurities contained in the aqueous extract emerging from the bottom of extractor 407. It can therefore be advantageously recycled by way of line 420, line 424, pump 425, valve 426, cooler 427, line 428, pump 405, and line 406 to the bottom of extractor 407. Alternatively, it can be fractionally distilled to separate oxygenated compounds, and the resulting hydrocarbon fraction, containing a minor proportion of oxygenated compounds, can be recycled to extractor 407, as set forth above.

I have observed that solid impurities, such as precipitated salts of iron or other metals, may tend to accumulate at the liquid interface in separator 417. Such materials may conveniently be removed by withdrawing liquid from the interfacial zone, either continuously or intermittently, filtering it, and returning the clean filtrate to the separator, suitably by way of heater 415 and line 416 (equipment not shown).

Optionally, an immiscible solvent, such as hexane, heptane, petroleum naphtha, cyclohexane, benzene, toluene, isopropyl ether, carbon tetrachloride, or the like, may be added through line 429 to the aqueous extract in line 412, or directly (not illustrated) to hot separator 417, to assist in the formation of a separate phase within the separator. Such a solvent should preferably, but not necessarily, boil below the boiling points of the organic oxygenated compounds in the aqueous solubilizer solution. When a solvent is employed, the solvent phase is withdrawn from the separator through lines 420 and 424, and is fed by pump 425 through valve 430 and heater 431 into an intermediate section of fractionator 432 for recovery of the solvent. The solvent is distilled overhead by reboiler 433 through condenser 434 into reflux drum 435, from which a portion is refluxed to the column through valve 436, and the remainder is withdrawn through valve 437 and recycled through lines 438 and 429. Makeup solvent is added to line 429 through line 439. The oxygenated compounds emerge from the bottom of the fractionator through line 440, cooler 441, and line 442.

It will be apparent that the relative positions of the phases in hot separator 417 will depend upon their relative specific gravities, which in turn will vary according to the nature of the process materials. Moreover, it will be apparent that the solvent may be recovered from fractionator 432 as either an overhead or bottom stream, depending on its boiling point in relation to the other constituents of the feed stream supplied to the column.

The depleted aqueous phase in hot separator 417 is withdrawn through line 443, and is introduced by pump 444 through heater 445 into stripper 446 at an intermediate point. The oxygenated compounds remaining in the entering stream are stripped therefrom by reboiler 447, and are taken overhead in combination with water vapor through condenser 448 into separator 449. The aqueous phase from the separator is refluxed to stripper 446 through valve 450, and the organic phase, comprising predominantly oxygenated compounds, is withdrawn through line 451, valve 452, and line 453. Clean solubilizer solution emerges from the bottom of stripper 446 through line 454 and cooler 455, and is recycled in part through valve 456, line 457, pump 408, and line 409 to the top of extractor 407. Make-up solubilizer solution may be added through line 458. The remaining solubilizer solution emerging from cooler 455 is withdrawn through valve 459 and line 460 for regeneration and recovery of organic acids from the organic-acid salts contained therein.

As an additional means for promoting phase separation in hot separator 417, the entering stream may be diluted, suitably to between 20 and 30 percent solubilizer concentration, by adding water to line 413 ahead of pump 414. The resulting diluted solubilizer solution must then be reconcentrated before it is recycled to extractor 407. In the flowsheet, the required reconcentration is effected in stripper 446, the extra water being distilled overhead, decanted from the organic phase in separator 449, and recycled through valve 461, line 462, and line 413. Make-up water may be added to line 462 through line 463.

My invention may be more fully understood from the following specific examples.

*Example I*

The following experiment illustrates the use of heat to separate an organic fraction from an aqueous solution of sodium organic-acid salts containing a mixture of organic oxygenated compounds and hydrocarbons.

An aqueous extractant solution was prepared, containing 50 percent by weight of sodium salts of organic acids obtained from the organic phase resulting from the hydrogenation of carbon monoxide in the presence of a fluidized, alkali-promoted iron catalyst. The resulting aqueous extractant solution was thereafter used to extract another organic phase, prepared in a similar manner by the hydrogenation of carbon monoxide, and thereby to prepare a primary aqueous extract, containing a mixture of organic oxygenated compounds and hydrocarbons.

A portion of the resulting primary aqueous extract was exhaustively steam distilled, and the organic phase of the distillate was separated and analyzed. This material, measuring 34.1 percent by weight of the portion of primary aqueous extract from which it was distilled, will be referred to hereinafter as the "original chemicals."

A 400-milliliter portion of the primary aqueous extract, weighting 413 grams, was heated to 65° C. and allowed to stand one hour, and the resulting organic phase, measuring 48 milliliters, was separated at 65° C. and analyzed. This phase will be referred to hereinafter as fraction I.

The resulting depleted aqueous phase was diluted with 350 milliliters of water, and an organic phase measuring 21.2 milliliters was separated. The diluted aqueous phase was then steam distilled, and the portion of the original chemicals remaining therein was readily volatilized and removed. The organic phase of the distillate measured 65.3 milliliters. The organic phases from the dilution and steam distillation, totalling 86.5 milliliters, were combined and analyzed. The combined organic phases will be referred to hereinafter as fraction II.

The analytical results were as follows:

|  | Original Chemicals | Fraction I | Fraction II |
|---|---|---|---|
| Alcohols, moles/liter | 2.38 | 0.456 | 2.91 |
| Total carbonyl compounds, moles/liter | 0.741 | 0.435 | 0.857 |
| Hydrocarbons, vol. percent | 58 | 80 | 42 |

*Example II*

The following example illustrates the simultaneous use of dilution and heating to separate an organic fraction from the primary aqueous extract.

A 237-milliliter portion of the primary aqueous extract, described in Example I, was diluted with 117.0 milliliters of water, heated to 65° C., and allowed to stand one hour, and the resulting organic phase, measuring 50.0 milliliters, was separated at 65° C. and analyzed. This organic phase will be referred to hereinafter as fraction III.

Subsequently, the depleted aqueous phase was exhaustively steam distilled, and the organic phase of the distillate, measuring 35 milliliters, was separated and analyzed. This organic phase will be referred to hereinafter as fraction IV.

The analytical results were as follows:

|  | Original Chemicals | Fraction III | Fraction IV |
|---|---|---|---|
| Alcohols, moles/liter | 2.38 | 0.845 | 5.29 |
| Total carbonyl compounds, moles/liter | 0.741 | 0.740 | 0.96 |
| Hydrocarbons, vol. percent | 58 | 72 | 25 |

*Example III*

For comparison, the following example illustrates simple dilution with water at ordinary temperatures to effect the separation of an organic fraction from the primary aqueous extract prepared in Example I.

A 400-milliliter portion of the primary aqueous extract was diluted with 197 grams of water at room temperature and allowed to stand one hour. The resulting organic phase, measuring 75 milliliters, was separated at 27° C. and analyzed. This organic phase will be referred to hereinafter as fraction V.

The depleted aqueous phase was subsequently subjected to exhaustive steam distillation, and the organic phase of the distillate, measuring 59 milliliters, was separated and analyzed. This organic phase will hereinafter be referred to as fraction VI.

The analytical results were as follows:

|  | Original Chemicals | Fraction V | Fraction VI |
|---|---|---|---|
| Alcohols, moles/liter | 2.38 | 0.495 | 4.41 |
| Total carbonyl compounds, moles/liter | 0.741 | 0.402 | 0.998 |
| Hydrocarbons, vol. percent | 58 | 75 | 31.5 |

While the foregoing flowsheet and examples illustrate advantageous forms of my invention, it will be understood that numerous departures may be made therefrom within the scope of the description and claims. In general, it can be said that any modifications or equivalents that would ordinarily occur to those skilled in the art are to be considered as lying within the scope of my invention.

In accordance with the foregoing description, I claim as my invention:

1. In a process for separating a preferentially oil-soluble organic oxygenated compound selected from the group consisting of alcohols, aldehydes, and ketones from a solution thereof comprising predominantly hydrocarbons by contacting said hydrocarbon solution with an aqueous extractant solution containing a substantially non-surface-active salt of a preferentially oil-soluble carboxylic acid, separating an aqueous extract containing said organic oxygenated compound, and recovering said organic oxygenated compound from said aqueous extract, the improvement which comprises heating said aqueous extract containing said organic oxygenated compound to an elevated temperature above about 60° C. to effect stratification of an organic phase therefrom while maintaining said aqueous extract in the liquid phase, withdrawing the lower aqueous phase containing said organic oxygenated compound dissolved therein, and distilling said organic oxygenated compound from said aqueous phase.

2. The process of claim 1 wherein said aqueous extract containing said organic oxygenated compound is heated to a temperature between about 75 and 100° C. to effect the stratification of said organic phase therefrom.

3. In a process for separating a mixture of preferentially oil-soluble organic oxygenated compounds selected from the group consisting of alcohols, aldehydes, and ketones from a solution thereof comprising predominantly hydrocarbons by contacting said hydrocarbon solution with an aqueous extractant solution containing water-soluble salts of a mixture of preferentially oil-soluble carboxylic acids having an average of less than eleven carbon atoms in the molecule, separating an aqueous extract containing said organic oxygenated compounds and hydrocarbon contaminants, and recovering said organic oxygenated compounds from said aqueous extract, the improvement which comprises heating said aqueous extract containing said organic oxygenated compounds and said hydrocarbon contaminants to an elevated temperature above about 60° C. while maintaining said aqueous extract in the liquid phase, whereby stratification of higher-boiling organic oxygenated compounds and said hydrocarbon contaminants as a liquid organic phase is induced, withdrawing said liquid organic phase comprising predominantly said higher-boiling organic oxygenated compounds and said hydrocarbon contaminants, withdrawing a purified aqueous extract containing a diminished concentration of hydrocarbon contaminants, and distilling said organic oxygenated compounds from said purified aqueous extract.

4. In a process for separating a preferentially oil-soluble organic oxygenated compound selected from the group consisting of alcohols, aldehydes, and ketones from a solution thereof comprising predominantly hydrocarbons by contacting said hydrocarbon solution with an aqueous extractant solution containing a substantially non-surface-active salt of a preferentially oil-soluble carboxylic acid, separating an aqueous extract containing said organic oxygenated compound, and recovering said organic oxygenated compound from said aqueous extract, the improvement which comprises subjecting said aqueous extract containing said organic oxygenated compound to dilution with water and to exposure to an elevated temperature above about 60° C. while maintaining said aqueous extract in the liquid phase, whereby hydrocarbon contaminants stratify therefrom as a liquid organic phase, withdrawing a purified aqueous extract containing a diminished concentration of hydrocarbon contaminants, and distilling said organic oxygenated compound from said purified aqueous extract.

5. In a process for separating a preferentially oil-soluble organic oxygenated compound selected from the group consisting of alcohols, aldehydes, and ketones from a solution thereof comprising predominantly hydrocarbons by contacting said hydrocarbon solution with an aqueous extractant solution containing a substantially non-surface-active salt of a preferentially oil-soluble carboxylic acid, separating an aqueous extract containing said organic oxygenated compound, and recovering said organic oxygenated compound from said aqueous extract, the improvement which comprises contacting said aqueous extract containing said organic oxygenated compound with an immiscible liquid solvent phase at an elevated temperature above about 60° C. while maintaining said aqueous extract in the liquid phase, whereby hydrocarbon contaminants are desolubilized and extracted therefrom, withdrawing a purified aqueous extract containing a diminished concentration of hydrocarbon contaminants, and distilling said organic oxygenated compound from said purified aqueous extract.

6. In a process for separating preferentially oil-soluble organic oxygenated compounds from a predominantly hydrocarbon mixture of the type obtained in the hydrogenation of carbon monoxide over an iron catalyst, the steps which comprise contacting said hydrocarbon mixture with an aqueous extractant solution containing a solubilizer consisting essentially of salts of a mixture of preferentially oil-soluble carboxylic acids of the class predominating in said hydrocarbon mixture, separating an aqueous extract containing said organic oxygenated compounds, heating said aqueous extract to an elevated temperature above about 60° C. while maintaining said aqueous extract in the liquid phase, whereby stratification of a liquid hydrocarbon contaminant phase is effected therefrom, withdrawing a purified aqueous extract containing a diminished concentration of hydrocarbon contaminants, and distilling said organic oxygenated compound from said purified aqueous extract.

VESTA F. MICHAEL.

References Cited in the file of this patent

UNITED STATES PATENTS

| Number | Name | Date |
|---|---|---|
| 2,258,500 | Mertens et al. | Oct. 7, 1941 |
| 2,274,750 | Soenksen et al. | Mar. 3, 1942 |
| 2,494,371 | Wadley | Jan. 10, 1950 |